(12) United States Patent
Akimoto

(10) Patent No.: US 9,244,740 B2
(45) Date of Patent: Jan. 26, 2016

(54) INFORMATION PROCESSING DEVICE, JOB SCHEDULING METHOD, AND JOB SCHEDULING PROGRAM

(71) Applicant: NEC Corporation, Minato-ku, Tokyo (JP)

(72) Inventor: Shunsuke Akimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 150 days.

(21) Appl. No.: 14/196,406

(22) Filed: Mar. 4, 2014

(65) Prior Publication Data

US 2014/0250287 A1 Sep. 4, 2014

(30) Foreign Application Priority Data

Mar. 4, 2013 (JP) .................................. 2013-041630

(51) Int. Cl.
*G06F 9/46* (2006.01)
*G06F 9/50* (2006.01)

(52) U.S. Cl.
CPC .......... *G06F 9/505* (2013.01); *G06F 2209/501* (2013.01)

(58) Field of Classification Search
None
See application file for complete search history.

(56) References Cited

U.S. PATENT DOCUMENTS

| 7,441,244 B2* | 10/2008 | Longobardi | G06F 9/5083 718/100 |
| 2009/0055823 A1* | 2/2009 | Zink | G06F 11/3419 718/100 |
| 2011/0173155 A1 | 7/2011 | Becchi et al. | |
| 2012/0005685 A1* | 1/2012 | Chen | G06F 9/5072 718/104 |
| 2013/0091507 A1* | 4/2013 | Wu | G06F 9/5038 718/104 |

FOREIGN PATENT DOCUMENTS

| JP | 2007-249491 A | 9/2007 |
| JP | 2007-310710 A | 11/2007 |
| JP | 2009-151745 A | 7/2009 |
| JP | 2011-197852 A | 10/2011 |

OTHER PUBLICATIONS

Japanese Office Action for JP Application No. 2013-041630 mailed on Jun. 17, 2014 with English Translation.

* cited by examiner

*Primary Examiner* — Kenneth Tang

(57) ABSTRACT

An information processing device includes: a measurement unit 10 for measuring respective use rates of a plurality of coprocessors each for executing a job, respective use rates of a plurality of interface cards each for passing data input or output by each of the plurality of coprocessors, and respective latencies and respective throughputs in communication between the plurality of coprocessors and the plurality of interface cards; and a determination unit 20 for determining a coprocessor that is to execute the job from among the plurality of coprocessors, based on a result of the measurement by the measurement unit 10.

4 Claims, 15 Drawing Sheets

- JOB NAME
- JOB EXECUTION NAME
- EXECUTION DIRECTORY
- RUNTIME OPTION
- I/O COMMUNICATION STATUS
- USED I/F DESIGNATION OPTION

- JOB A
- job.exe
- /tmp
- "–A –t 10"
- True
- "–i"

|     | copro1 | copro2 | copro3 | copro4 |
|-----|--------|--------|--------|--------|
| if1 | 20     | 120    | 150    | 120    |
| if2 | 120    | 20     | 120    | 150    |
| if3 | 150    | 120    | 20     | 120    |
| if4 | 120    | 150    | 120    | 20     |

UNIT:ns (b)

|     | copro1 | copro2 | copro3 | copro4 |
|-----|--------|--------|--------|--------|
| if1 | 5,000  | 3,000  | 3,000  | 3,000  |
| if2 | 3,000  | 5,000  | 3,000  | 3,000  |
| if3 | 3,000  | 3,000  | 5,000  | 3,000  |
| if4 | 3,000  | 3,000  | 3,000  | 5,000  |

UNIT:MB/s

FIG. 8

|     | CURRENT TRANSFER AMOUNT | MAXIMUM TRANSFER AMOUNT |
|-----|-------------------------|-------------------------|
| if1 | 3,000                   | 5,000                   |
| if2 | 4,500                   | 5,000                   |
| if3 | 2,000                   | 5,000                   |
| if4 | 1,200                   | 5,000                   |

UNIT:MB/s

FIG. 9

|  | NUMBER OF CORES BEING USED | MAXIMUM NUMBER OF CORES |
|---|---|---|
| copro1 | 30 | 50 |
| copro2 | 0 | 50 |
| copro3 | 50 | 50 |
| copro4 | 10 | 50 |

FIG. 10

|  | DATA TRANSFER AMOUNT | NUMBER OF I/O ISSUANCES | CPU TIME |
|---|---|---|---|
| JOB A | 3,000 | 10 | 521 |
| JOB B | 500 | 3 | 300 |
| JOB C | 1,200 | 100 | 128 |
| ... | ... | ... | ... |
| JOB m | 1,000 | 20 | 314 |
|  | UNIT:MB | UNIT:TIMES | UNIT:(SECONDS)·(CORE) |

US 9,244,740 B2

INFORMATION PROCESSING DEVICE, JOB SCHEDULING METHOD, AND JOB SCHEDULING PROGRAM

INCORPORATION BY REFERENCE

This application is based upon and claims the benefit of priority from Japanese patent application No. 2013-041630, filed on Mar. 4, 2013, the disclosure of which is incorporated here in its entirety by reference.

TECHNICAL FIELD

The present invention relates to an information processing device for scheduling a plurality of jobs, a job scheduling method, and a computer-readable recording medium having recorded thereon a job scheduling program.

BACKGROUND ART

A plurality of devices for significantly increasing a computer's computing power, which are called coprocessors or accelerators represented by GPGPU (General Purpose GPU (Graphics Processing Units)), may be included in the computer and used. In such a case, a scheduling scheme for efficient use of these coprocessors or accelerators is needed.

Accelerators mainly focus on computing functions, and so it is difficult to directly issue an I/O (Input/Output) from an accelerator to an I/F (Interface) card. In view of this, coprocessors or accelerators that have a function of performing I/O communication from a coprocessor or an accelerator directly through an I/F card are emerging as represented by the feature called GPUDirect.

An example of a scheduling scheme used in the case of executing a plurality of jobs by a plurality of coprocessors in parallel is a scheduling scheme described in Patent Literature (PTL) 1.

PTL 1: the specification of United States Patent Application Publication No.

SUMMARY

An exemplary object of the present invention is to provide an information processing device, a job scheduling method, and a job scheduling program that, in the case of executing a plurality of jobs by a plurality of coprocessors in parallel, can reduce the execution time of the plurality of jobs.

An exemplary aspect of the present invention is an information processing device including: a measurement unit for measuring respective use rates of a plurality of coprocessors each for executing a job, respective use rates of a plurality of interface cards each for passing data input or output by each of the plurality of coprocessors, and respective latencies and respective throughputs in communication between the plurality of coprocessors and the plurality of interface cards; and a determination unit for determining a coprocessor that is to execute the job from among the plurality of coprocessors, based on a result of the measurement by the measurement unit.

An exemplary aspect of the present invention is a job scheduling method including: measuring respective use rates of a plurality of coprocessors each for executing a job, respective use rates of a plurality of interface cards each for passing data input or output by each of the plurality of coprocessors, and respective latencies and respective throughputs in communication between the plurality of coprocessors and the plurality of interface cards; and determining a coprocessor that is to execute the job from among the plurality of coprocessors, based on a result of the measurement.

An exemplary aspect of the present invention is a computer-readable recording medium having recorded thereon a job scheduling program for causing a computer to execute: a process of measuring respective use rates of a plurality of coprocessors each for executing a job, respective use rates of a plurality of interface cards each for passing data input or output by each of the plurality of coprocessors, and respective latencies and respective throughputs in communication between the plurality of coprocessors and the plurality of interface cards; and a process of determining a coprocessor that is to execute the job from among the plurality of coprocessors, based on a result of the measurement.

BRIEF DESCRIPTION OF THE DRAWINGS

FIG. 7 It is an explanatory diagram depicting an example of an I/O affinity table.

FIG. 8 It is an explanatory diagram depicting an example of I/O transfer amount information.

FIG. 9 It is an explanatory diagram depicting an example of coprocessor use rate information.

FIG. 10 It is an explanatory diagram depicting an example of a job profile.

DESCRIPTION OF EXEMPLARY EMBODIMENTS

Exemplary Embodiment 1

The following describes Exemplary Embodiment 1 of the present invention with reference to drawings.

Figure 1:
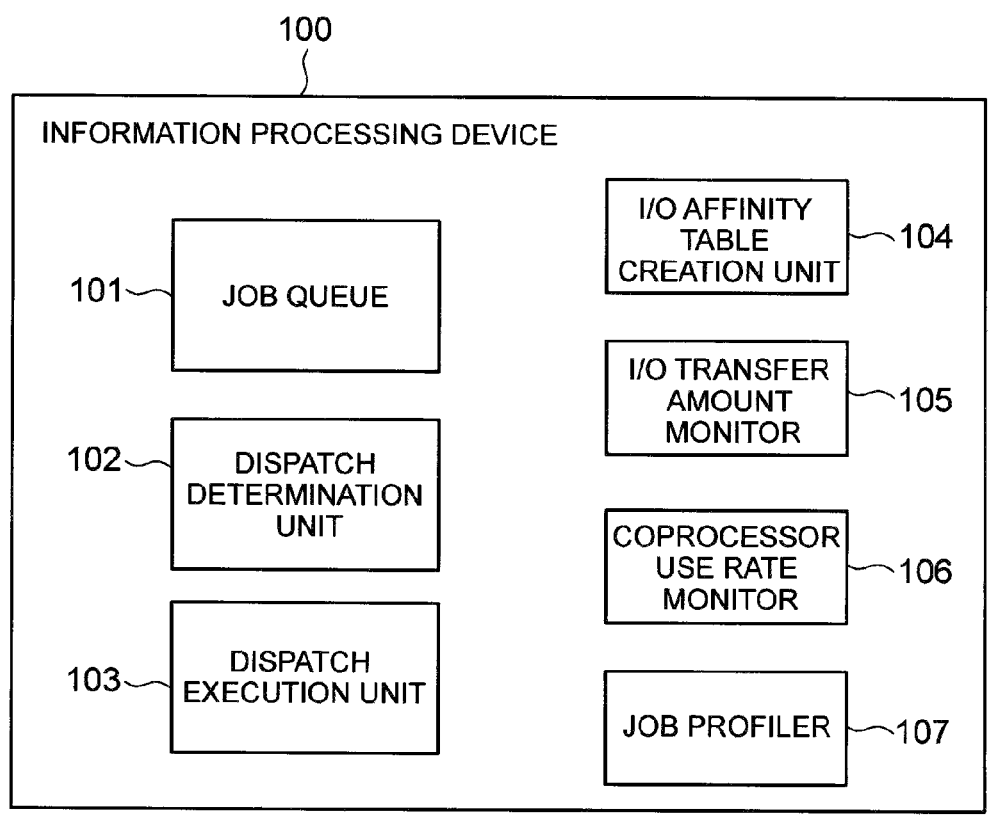
FIG. 1 It is a block diagram depicting a structure of Exemplary Embodiment 1 of an information processing device according to the present invention.

FIG. 1 is a block diagram depicting a structure of Exemplary Embodiment 1 of an information processing device according to the present invention.

An information processing device 100 is a computer, such as a personal computer, that includes coprocessors (not depicted) and I/F cards (not depicted). The information processing device 100 determines by which coprocessors and I/F cards a plurality of jobs input to the information processing device 100 by a user are to be executed in which order, to reduce the total execution time of the plurality of jobs. The information processing device 100 schedules the jobs based on the determination result, and executes the jobs on the coprocessors.

As depicted in FIG. 1, the information processing device 100 includes a job queue 101, a dispatch determination unit 102, a dispatch execution unit 103, an I/O affinity table creation unit 104, an I/O transfer amount monitor 105, a coprocessor use rate monitor 106, and a job profiler 107.

The job queue 101 is a queue for temporarily storing jobs input to the information processing device 100.

The dispatch determination unit 102 acquires a job from the job queue 101, and determines which coprocessor is to be assigned the acquired job.

The dispatch execution unit 103 outputs a job command to the coprocessor. As a result, a process corresponding to the job command is executed on the coprocessor.

The I/O affinity table creation unit 104 creates an I/O affinity table. The I/O affinity table is a table including affinity information (hereafter referred to as "I/O affinity information" or "communication affinity information") between each coprocessor and each I/F card. The I/O affinity information is information indicating the latency and the throughput in the communication between each coprocessor and each I/F card. The I/O affinity table is stored in, for example, a storage unit (not depicted) included in the information processing device 100.

The I/O transfer amount monitor 105 measures the data transfer amount of each I/F card, and creates I/O transfer amount information indicating the current data transfer amount of each I/F card. The I/O transfer amount information is stored in, for example, a storage unit (not depicted) included in the information processing device 100.

The coprocessor use rate monitor 106 acquires, from each coprocessor, information indicating the use rate of the coprocessor, and registers the acquired information in coprocessor use rate information. The coprocessor use rate information is stored in, for example, a storage unit (not depicted) included in the information processing device 100.

The job profiler 107 creates a job profile. The job profile is information for recording the features of the jobs input to the information processing device 100. The job profile is stored in, for example, a storage unit (not depicted) included in the information processing device 100.

For example, the dispatch determination unit 102, the dispatch execution unit 103, the I/O affinity table creation unit 104, the I/O transfer amount monitor 105, the coprocessor use rate monitor 106, and the job profiler 107 are realized by a computer operating according to a job scheduling program. In this case, a CPU reads the job scheduling program and, according to the program, operates as the dispatch determination unit 102, the dispatch execution unit 103, the I/O affinity table creation unit 104, the I/O transfer amount monitor 105, the coprocessor use rate monitor 106, and the job profiler 107. Alternatively, the dispatch determination unit 102, the dispatch execution unit 103, the I/O affinity table creation unit 104, the I/O transfer amount monitor 105, the coprocessor use rate monitor 106, and the job profiler 107 may each be realized by separate hardware.

The job queue 101 is realized by a storage device such as a RAM (Random Access Memory) included in the information processing device 100.

Figure 2:
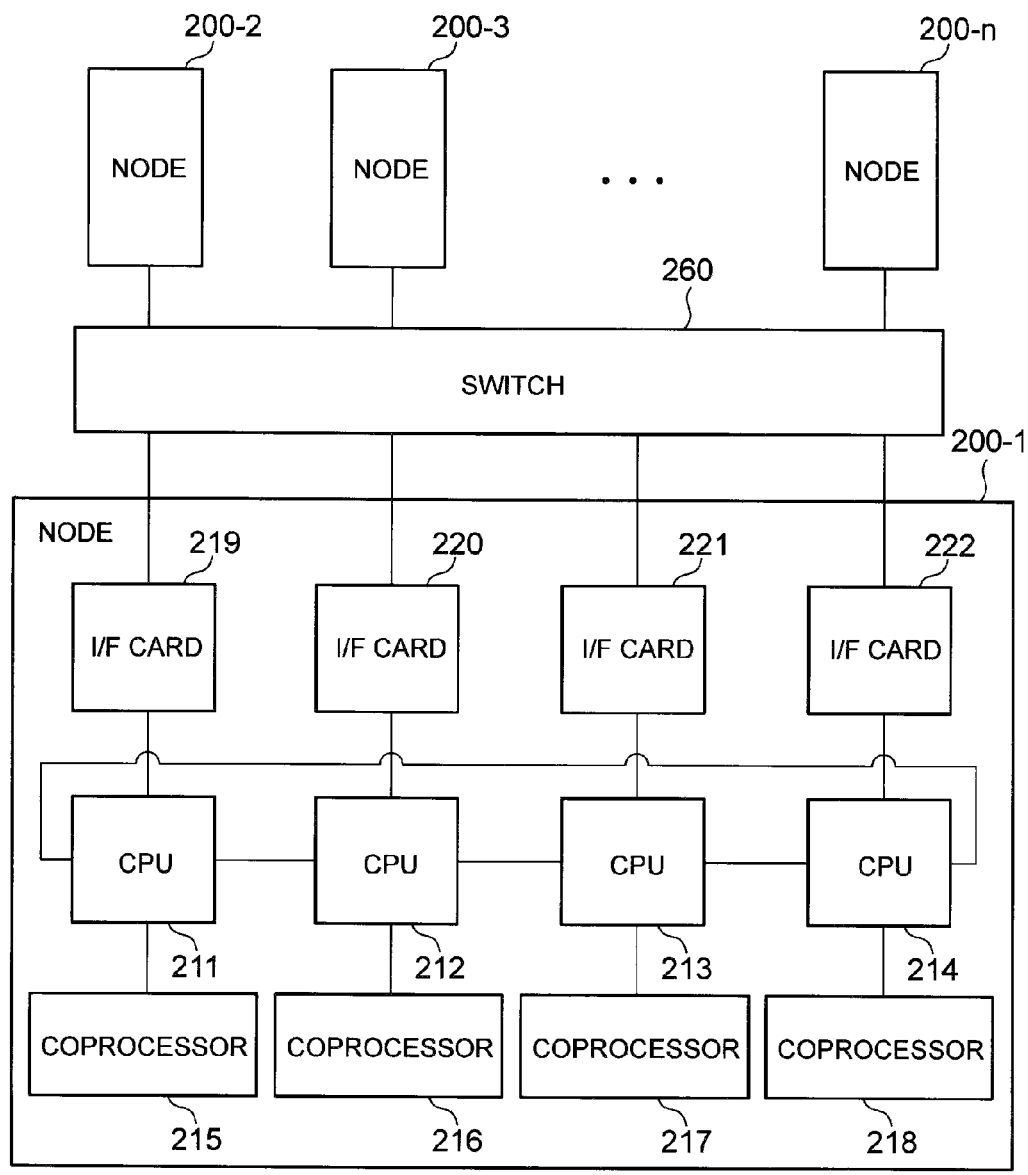
FIG. 2 It is a block diagram depicting an example of a structure of a system that is subject to scheduling.

FIG. 2 is a block diagram depicting an example of a structure of a system that is subject to scheduling.

In the system depicted in FIG. 2, nodes 200-1 to 200-$n$ are connected via a switch 260. Each node is a computer including a CPU, a memory, an I/O, and the like. In the example depicted in FIG. 2, each node includes CPUs 211 to 214, coprocessors 215 to 218, and I/F cards 219 to 222. Hereafter, the CPUs 211 to 214 are also referred to as "hosts". Moreover, an OS running on a host is referred to as "host OS", and an OS running on a coprocessor as "coprocessor OS".

In this exemplary embodiment, a job scheduling program (hereafter referred to as "job scheduler") according to the present invention is applied to each node. That is, the job scheduler is incorporated in each node, and executes processes on a host OS and a coprocessor OS in the node. In detail, a CPU and a coprocessor operate as the dispatch determination unit 102, the dispatch execution unit 103, the I/O affinity table creation unit 104, the I/O transfer amount monitor 105, the coprocessor use rate monitor 106, and the job profiler 107, according to the program. The job queue 101 is realized by a storage device such as a RAM included in each node.

Though one switch is depicted in FIG. 2 as an example, the number of switches may be two or more. Moreover, the connection structure between each node and the switch is not limited to the connection structure depicted in FIG. 2. Though four CPUs, four coprocessors, and four I/F cards are depicted in FIG. 2 as an example, the number of CPUs, the number of coprocessors, and the number of I/F cards may each be other than four. Moreover, the connection structure between the CPUs, the coprocessors, and the I/F cards is not limited to the connection structure depicted in FIG. 2.

The coprocessors 215 to 218 supplement the computing functions of the CPUs 211 to 214. For example, the coprocessors 215 to 218 are expansion cards, or chips implemented on the motherboard of the node. Each coprocessor is composed of the number of cores several times to several tens of times that of a typical CPU. The coprocessor operates all cores simultaneously, thereby exhibiting computing power several times to several tens of times that in the case of operating a CPU alone. Another OS independent of a host OS runs on the coprocessor. Thus, the coprocessors 215 to 218 can perform communication and jobs equally with the hosts.

The I/F cards 219 to 222 perform communication with other nodes or storages outside the node. Examples of the I/F cards 219 to 222 include an InfiniBand HCA (Host Channel Adapter) card, a gigabit Ethernet® HBA (Host Bus Adapter) card, and a 10-gigabit Ethernet® HBA card.

The switch 260 performs switching for connection between the nodes. The switch 260 and each I/F card are connected according to the same protocol as the protocol supported by the I/F card. As an example, in the case where the I/F cards 219 to 222 are InfiniBand HCA cards, the switch 260 is an InfiniBand switch, and the I/F cards 219 to 222 and the switch 260 are connected according to the InfiniBand protocol. In this case, the nodes communicate with each other according to the InfiniBand protocol.

The job scheduler runs independently on each node, to adjust jobs in the node. In actual operation, it is expected that the plurality of nodes have a cluster structure in which job scheduling for adjusting balance between the nodes and job scheduling for adjusting jobs in each node are combined. In this exemplary embodiment, job scheduling for adjusting balance between the nodes is assumed to be performed by an existing job scheduler.

In this exemplary embodiment, a CPU bus connects between CPUs. Meanwhile, a standard bus such as PCI Express® connects between a CPU and a coprocessor and between a CPU and an I/F card. Note that other buses may be used to connect between CPUs, between a CPU and a coprocessor, and between a CPU and an I/F card.

Figure 3:
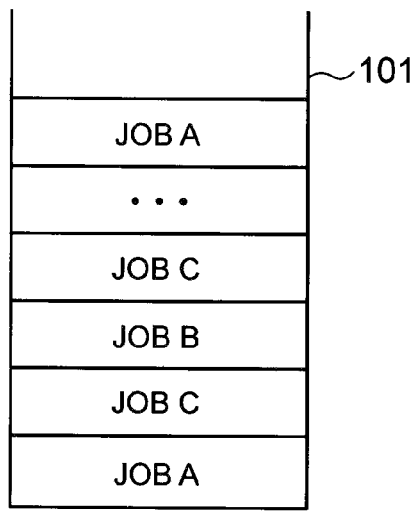
FIG. 3 It is an explanatory diagram depicting an example of a job queue.

FIG. 3 is an explanatory diagram depicting an example of the job queue 101. As depicted in FIG. 3, the job queue 101 is a buffer of a FIFO (First-In First-Out) structure, and stores a plurality of jobs in input order. The jobs are input to the job queue 101 according to instructions by the user, as an example. The input jobs are extracted from the job queue 101 in input order, and scheduled by the dispatch determination unit 102 and the dispatch execution unit 103.

Figure 4:
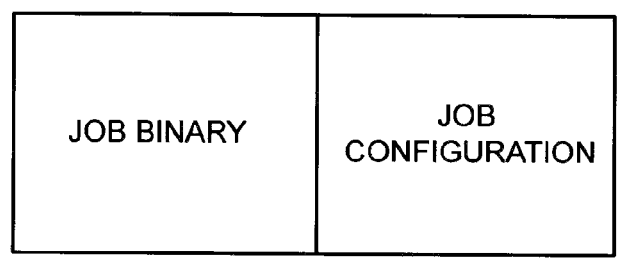
FIG. 4 It is an explanatory diagram depicting an example of a structure of a job.

FIG. 4 is an explanatory diagram depicting an example of a structure of a job. The job includes a job binary which is a program for executing the job, and a job configuration which is information indicating an environment in which the job is executed. The job configuration is written by the user beforehand. The job which is the combination of the job configuration and the job binary is created and input to the job queue 101 according to an instruction by the user.

Figure 5:
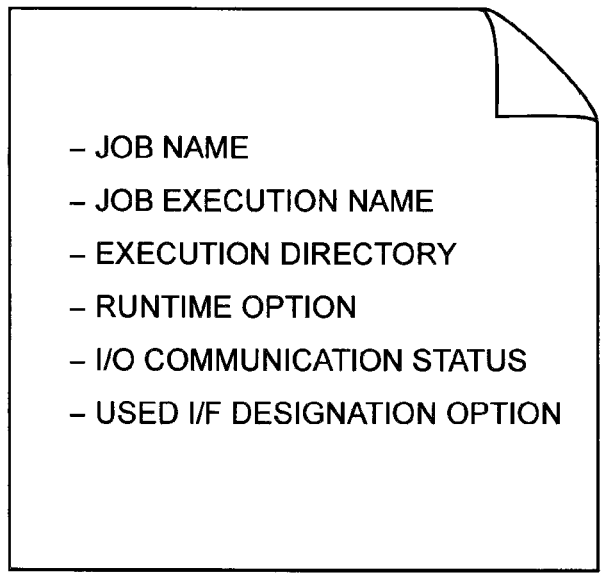
FIG. 5 It is an explanatory diagram depicting an example of a job configuration.

FIG. 5 is an explanatory diagram depicting an example of the job configuration. The job configuration includes information indicating "job name", "job execution name", "execution directory", "runtime option", "I/O communication status", and "used I/F designation option".

In FIG. 5, "job name" is the name of the job, "job execution name" is the name of an execution file of the job, "execution directory" is a directory for executing the execution file, "I/O communication status" indicates whether or not I/O communication is performed, and "used I/F designation option" is an option for designating an I/F card used.

Figure 6:
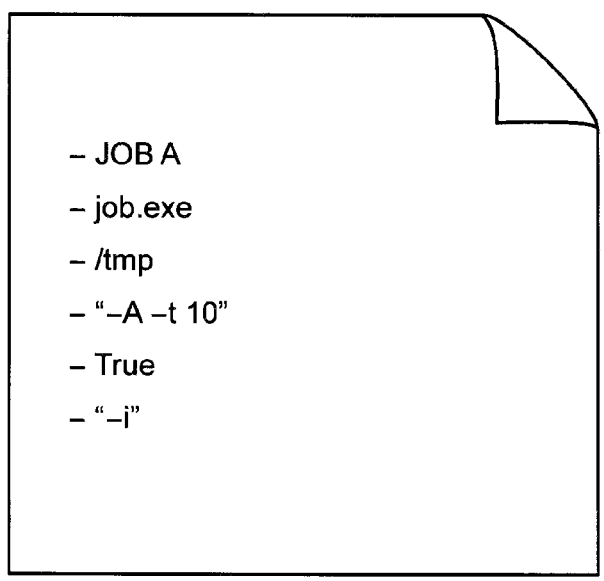
FIG. 6 It is an explanatory diagram depicting a description example of a job configuration.

FIG. 6 is an explanatory diagram depicting a description example of the job configuration. In the example depicted in FIG. 6, "job A" is set as "job name", "job.exe" is set as "job execution name", "Amp" is set as "execution directory", "-A -t 10" is set as "runtime option", and "-i" is set as "used I/F designation option". Here, "-i" indicates that an I/F card can be designated for job A. "True" is set as "I/O communication status".

In the case where the dispatch execution unit 103 designates the I/F card 221 and executes job A depicted in FIG. 6, the dispatch execution unit 103 outputs a command "/tmp/job.exe -A -t 10 -i IF3" to the coprocessor. The identifier of the designated I/F card follows "-i". Here, "IF3" is the identifier indicating the I/F card 221.

FIG. 7 is an explanatory diagram depicting an example of the I/O affinity table. The I/O affinity table includes I/O affinity information for each combination of I/F card and coprocessor used. In FIG. 7, "copro1" to "copro4" correspond to the coprocessors 215 to 218 respectively, and "if1" to "if4" correspond to the I/F cards 219 to 222 respectively.

(a) in FIG. 7 depicts a table indicating the latency in the case where each coprocessor designates each I/F card and performs communication. (b) in FIG. 7 depicts a table indicating the throughput in the case where each coprocessor designates each I/F card and performs communication. For example, the latency and the throughput in the case where copro2 (the coprocessor 216) designates if2 (the I/F card 220) and performs communication are respectively 20 ns and 5000 MB/s.

FIG. 8 is an explanatory diagram depicting an example of the I/O transfer amount information. The I/O transfer amount information is information indicating the data transfer amount of each I/F card. In detail, the I/O transfer amount information indicates the data transfer amount of each I/F card, by information of the maximum transfer amount and the current transfer amount. For example, the maximum transfer amount of if2 (the I/F card 220) is 5000 MB/s, and the current transfer amount of if2 (the I/F card 220) is 4500 MB/s.

FIG. 9 is an explanatory diagram depicting an example of the coprocessor use rate information. The coprocessor use rate information includes information indicating the number of cores being used and the maximum number of cores that can be used, from among the plurality of cores in each coprocessor. In the example depicted in FIG. 9, copro4 (the coprocessor 218) is using 10 cores from among 50 cores as the maximum number of cores. That is, the use rate of copro4 is 20% (=10/50).

FIG. 10 is an explanatory diagram depicting an example of the job profile. The job profile is information unique to each job name, and includes information indicating the execution characteristics of the job. In the example depicted in FIG. 10, the data transfer amount (unit: MB), the number of I/O issuances (unit: times), and the CPU time (unit: (seconds)·(core)) are stored as the information indicating the execution characteristics of the job. The CPU time is the time other than the time consumed by the I/O, and represents the time taken in the case where the job is executed by one core on the coprocessor. Note that (seconds)·(core) is the unit expressing the number of seconds per core. For example, job A involves data transfer of 3000 MB in total with ten I/O issuances, and takes 521 seconds in the case where computation other than the I/O is executed by only one core.

Figure 11:
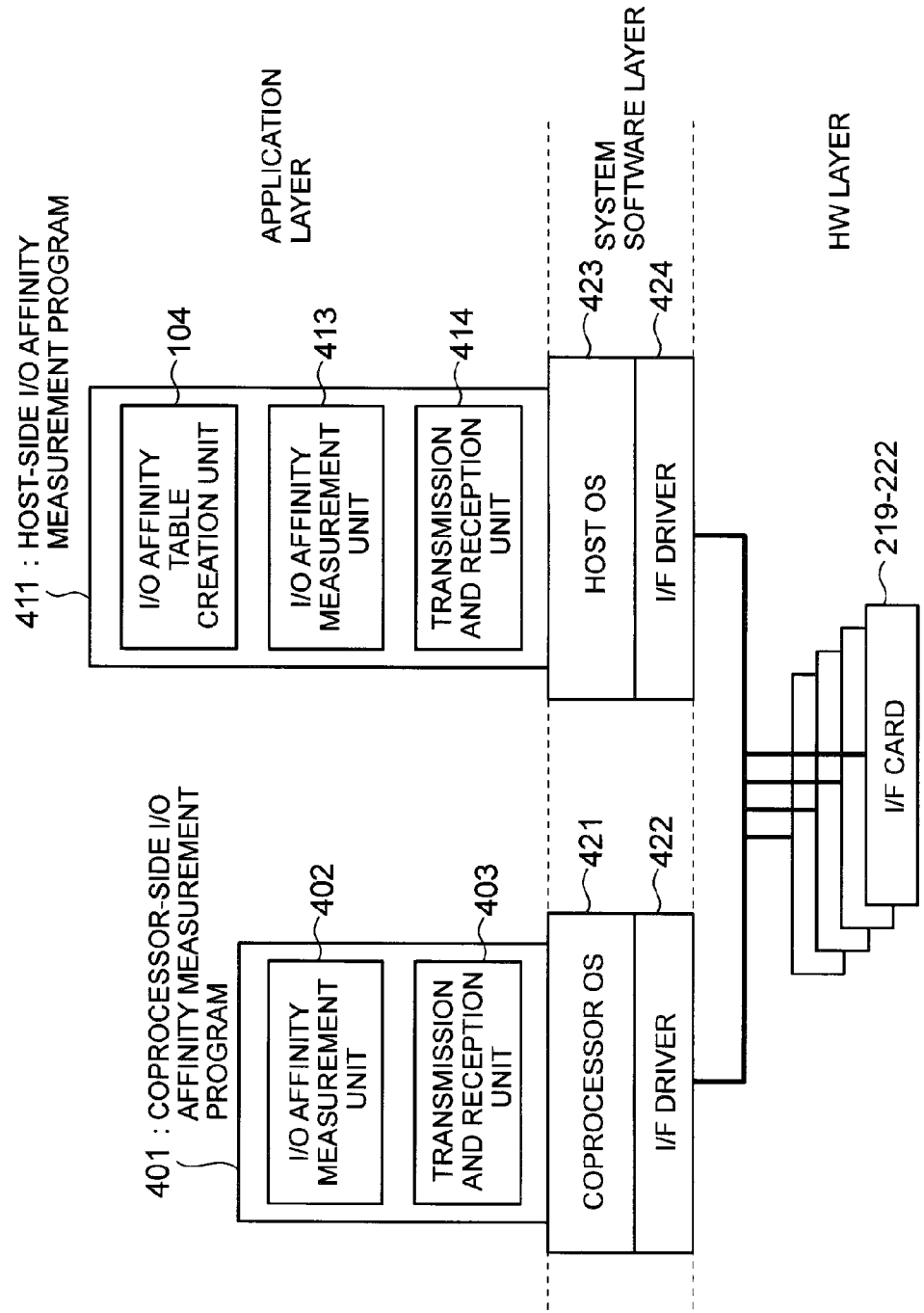
FIG. 11 It is a block diagram depicting an example of a location of an I/O affinity table creation unit.

FIG. 11 is a block diagram depicting an example of the location of the I/O affinity table creation unit 104.

The coprocessors and the CPUs are connected via a bus in a hardware (HW) layer. The I/F cards 219 to 222 are also connected to the same bus.

A coprocessor OS 421 performs data transmission and reception in a system software layer, with the HW layer via an I/F driver 422. A coprocessor-side I/O affinity measurement program 401 in an application layer is a program running on the coprocessor OS 421. The coprocessor-side I/O affinity measurement program 401 includes an I/O affinity measurement unit 402 and a transmission and reception unit 403.

A host OS 423 performs data transmission and reception in the system software layer, with the HW layer via an I/F driver 424. A host-side I/O affinity measurement program 411 in the application layer is a program running on the host OS 423. The host-side I/O affinity measurement program 411 includes an I/O affinity measurement unit 413 and a transmission and reception unit 414.

The coprocessor-side I/O affinity measurement program 401 and the host-side I/O affinity measurement program 411 communicate with each other through each of the I/F cards 219 to 222, and measures the latency and the throughput in the communication. In detail, the transmission and reception unit 403 and the transmission and reception unit 414 communicate with each other, and the I/O affinity measurement unit 402 and the I/O affinity measurement unit 413 measure the latency and the throughput.

In this exemplary embodiment, the I/O affinity table creation unit 104 is included in the host-side I/O affinity measurement program 411 and operates as one of the functions of the host-side I/O affinity measurement program 411. The I/O affinity table creation unit 104 creates the I/O affinity table from the measurement results.

Figure 12:
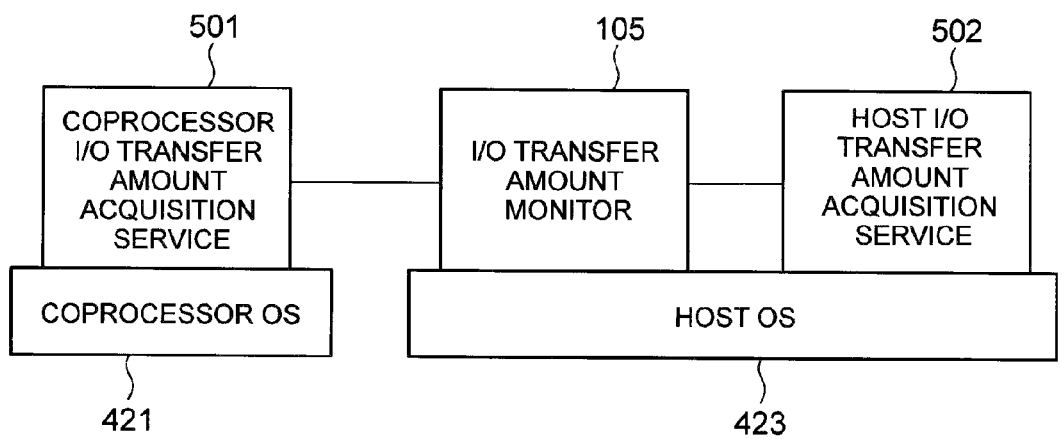
FIG. 12 It is a block diagram depicting an example of a location of an I/O transfer amount monitor.

FIG. 12 is a block diagram depicting an example of the location of the I/O transfer amount monitor 105.

As depicted in FIG. 12, in this exemplary embodiment, the I/O transfer amount monitor 105 is located on the host OS 423. That is, the I/O transfer amount monitor 105 runs on the host OS 423.

The I/O transfer amount monitor 105 acquires the data transfer amount between the coprocessor and each I/F card, from a coprocessor I/O transfer amount acquisition service 501 running on the coprocessor. The I/O transfer amount monitor 105 also acquires the data transfer amount between the CPU other than the coprocessor and each I/F card, from a host I/O transfer amount acquisition service 502. The coprocessor I/O transfer amount acquisition service 501 and the host I/O transfer amount acquisition service 502 are programs for acquiring the data transfer amounts from the coprocessor OS 421 and the host OS 423 respectively.

The I/O transfer amount monitor 105 updates the I/O transfer amount information of each I/F card, based on the information acquired from the coprocessor I/O transfer amount acquisition service 501 and the host I/O transfer amount acquisition service 502.

Figure 13:
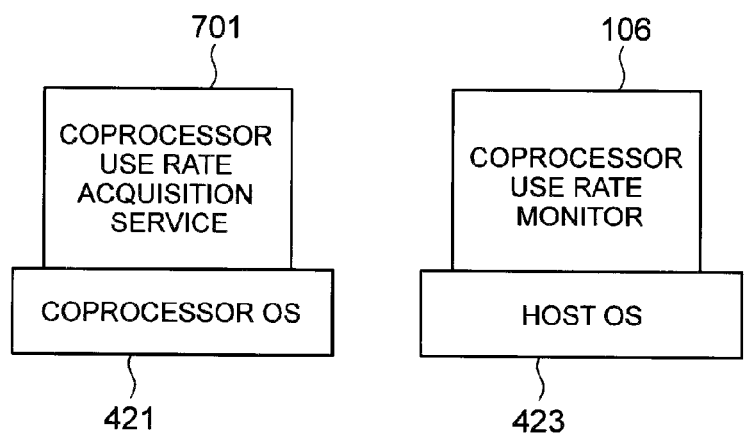
FIG. 13 It is a block diagram depicting an example of a location of a coprocessor use rate monitor.

FIG. 13 is a block diagram depicting an example of the location of the coprocessor use rate monitor 106.

As depicted in FIG. 13, in this exemplary embodiment, the coprocessor use rate monitor 106 is located on the host OS 423. That is, the coprocessor use rate monitor 106 runs on the host OS 423.

The coprocessor use rate monitor 106 acquires the use rate of the coprocessor from a coprocessor use rate acquisition service 701 running on the coprocessor OS 421, and updates the coprocessor use rate information. The coprocessor use rate acquisition service 701 is a program for acquiring the use rate of the cores of the coprocessor from the coprocessor OS 421.

Figure 14:
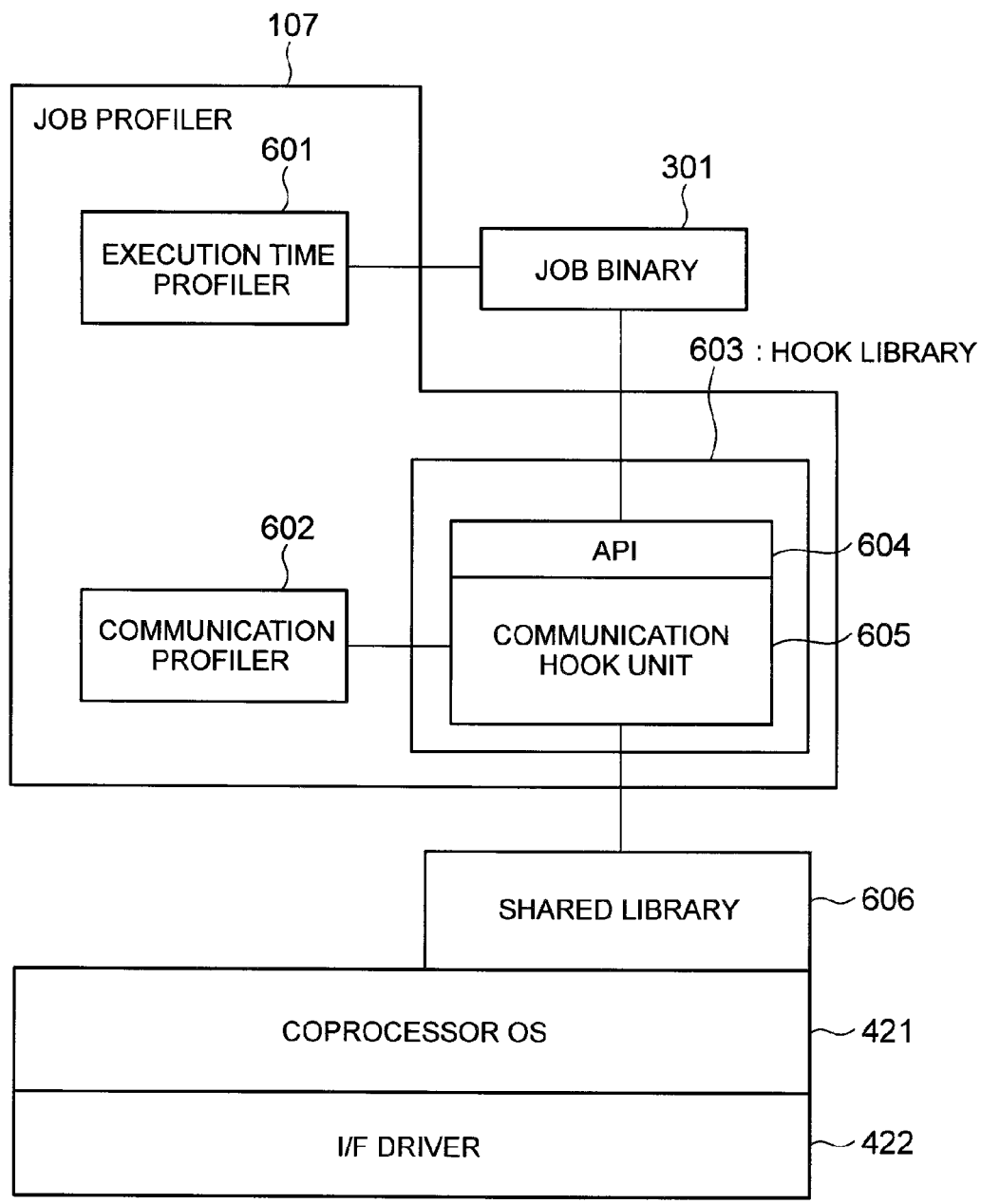
FIG. 14 It is a block diagram depicting an example of a structure and location of a job profiler.

FIG. 14 is a block diagram depicting an example of the structure and location of the job profiler 107.

As depicted in FIG. 14, in this exemplary embodiment, the job profiler 107 is located on the coprocessor OS 421. That is, the job profiler 107 runs on the coprocessor OS 421. In detail, the job profiler 107 is a program group including an execution time profiler 601, a communication profiler 602, and a hook library 603.

The execution time profiler 601 measures the CPU time of a job binary. A job binary 301 depicted in FIG. 14 is a job binary included in a job which the dispatch determination unit 102 has acquired from the job queue 101.

The communication profiler 602 measures the data transfer amount of the job.

The hook library 603 is a shared library running on the coprocessor. The hook library 603 monitors job operation, between the job binary 301 and a shared library 606 used by the job binary 301. This enables the communication profiler 602 to measure the data transfer amount of the job.

The hook library 603 includes an API 604 and a communication hook unit 605.

The API 604 is an application program interface (API) for making the job profiler 107 appear to be the shared library 606, to the job binary 301.

The communication hook unit 605 snoops for, i.e. monitors, the I/O communication of the job binary 301 via the API 604.

Figure 15:
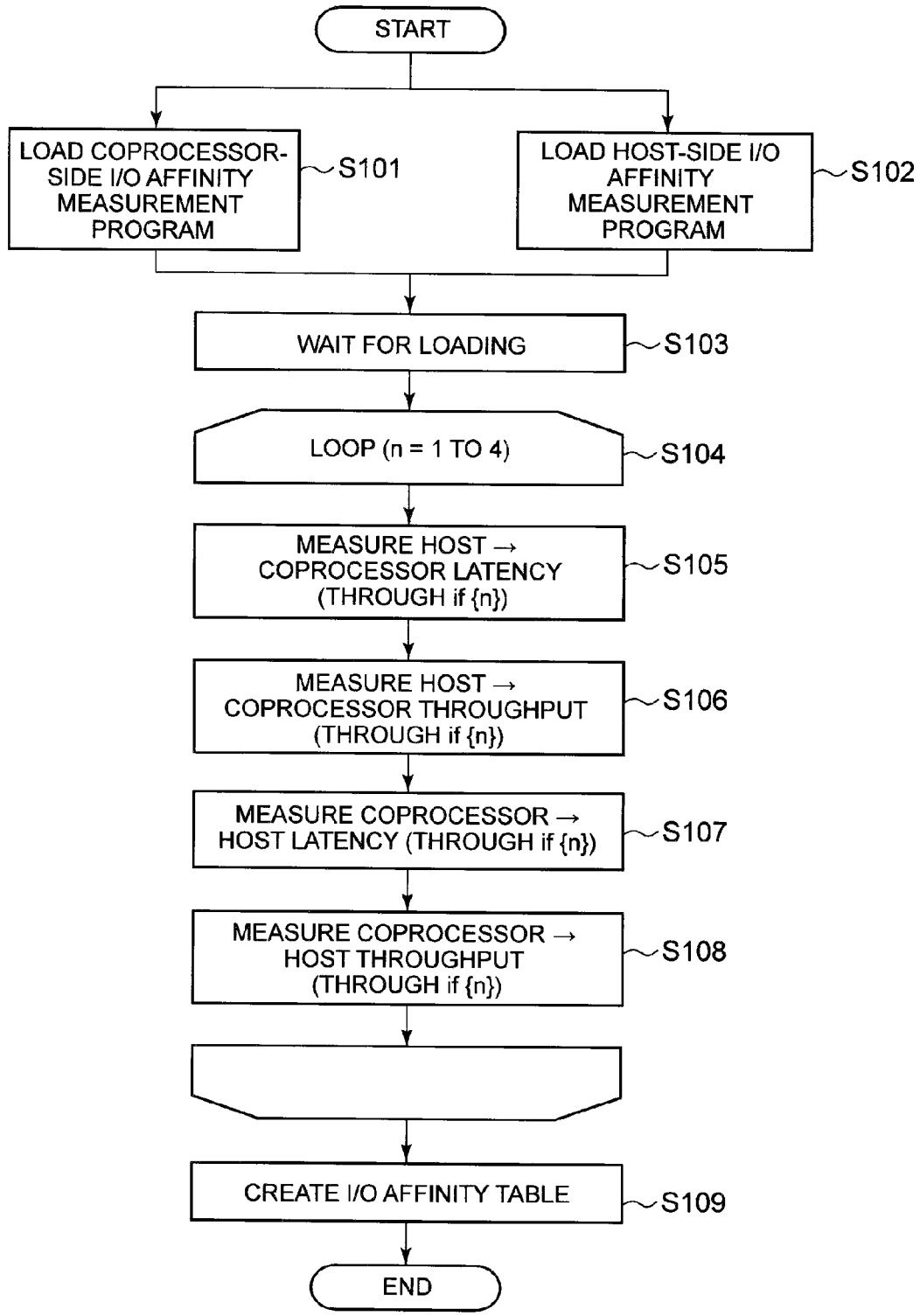
FIG. 15 It is a flowchart depicting an I/O affinity table creation process.

FIG. 15 is a flowchart depicting the I/O affinity table creation process. The I/O affinity table creation is performed only once upon startup of the computer. That is, the I/O affinity table creation unit 104 is activated only once upon startup of the computer.

When the computer starts up, the coprocessor-side I/O affinity measurement program 401 is loaded onto the coprocessor OS (step S101), and also the host-side I/O affinity measurement program 411 is loaded onto the host OS (step S102).

After the loading of both programs is completed (step S103), the host-side I/O affinity measurement program 411 and the coprocessor-side I/O affinity measurement program 401 start measuring the I/O affinity.

The host-side I/O affinity measurement program 411 and the coprocessor-side I/O affinity measurement program 401 perform the subsequent process (the process of steps S105 to S108) through all I/F cards (the I/F cards 219 to 222) one by one, and measure the latency and the throughput in the case where each I/F card is involved (step S104).

First, the transmission and reception unit 414 in the host-side I/O affinity measurement program 411 transmits a communication packet of a small size to the coprocessor-side I/O affinity measurement program 401, through the I/F card to be measured. The I/O affinity measurement units 402 and 413 measure the transfer time to measure the latency in cooperation (step S105).

Next, the host-side I/O affinity measurement program 411 transmits a communication packet of a large size to the coprocessor-side I/O affinity measurement program 401. The I/O affinity measurement units 402 and 413 measure the transfer time to measure the throughput in cooperation (step S106).

The coprocessor-side I/O affinity measurement program 401 performs the latency measurement and the throughput measurement in the reverse direction, i.e. the measurement of the latency and the throughput in the communication from the coprocessor to the host, in the same way as steps S105 and S106 (steps S107 and S108).

After the measurement for all I/F cards is completed, the I/O affinity table creation unit 104 summarizes the measurement results obtained from each I/F card, updates the I/O affinity table between the host and the coprocessor (step S109), and completes the measurement.

Figure 16:
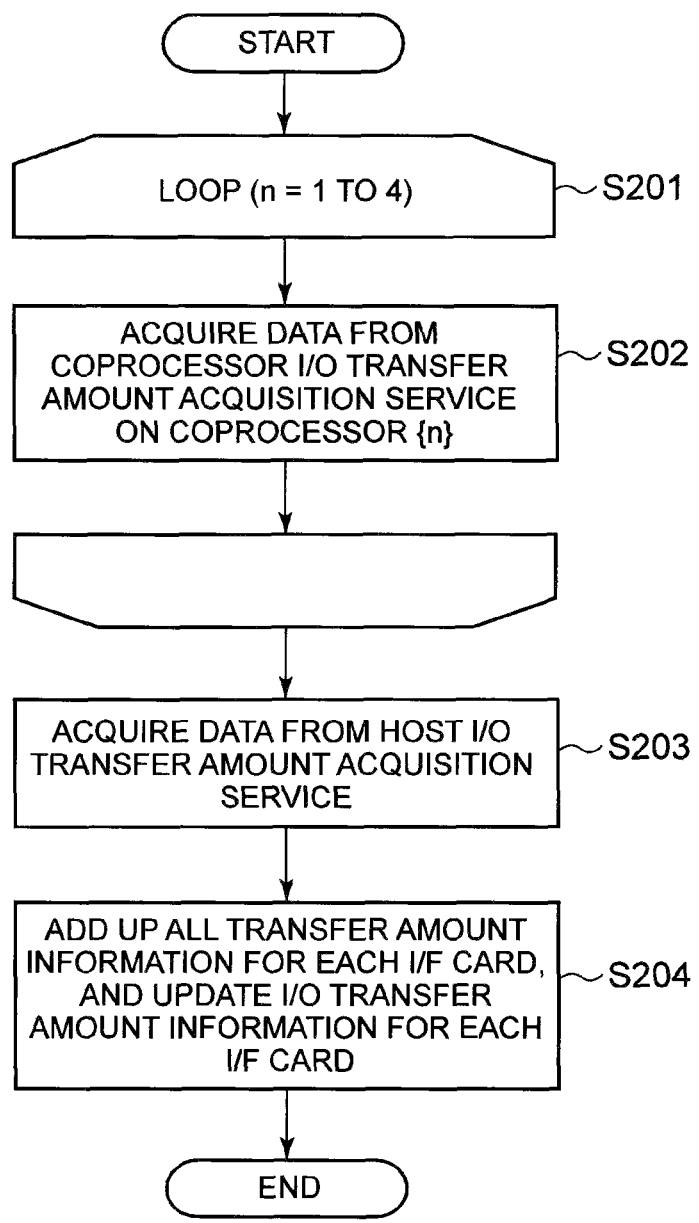
FIG. 16 It is a flowchart depicting an example of an operation of the I/O transfer amount monitor.

FIG. 16 is a flowchart depicting an example of the operation of the I/O transfer amount monitor 105. The I/O transfer amount monitor 105 performs the data transfer amount measurement intermittently or regularly at short intervals of about several seconds.

First, the I/O transfer amount monitor 105 acquires, from the coprocessor I/O transfer amount acquisition service 501 on each coprocessor (the coprocessors 215 to 218), information indicating the data transfer amount from the coprocessor to each I/F card (steps S201 and S202).

Next, the I/O transfer amount monitor 105 acquires, from the host I/O transfer amount acquisition service 502, information indicating the data transfer amount from the host to each I/F card (step S203).

Lastly, the I/O transfer amount monitor 105 adds up, for each I/F card, the data transfer amounts indicated by the transfer amount information acquired from the host and each coprocessor, to calculate the total data transfer amount for each I/F card. The I/O transfer amount monitor 105 updates the I/O transfer amount information based on the calculation results (step S204).

Figure 17:
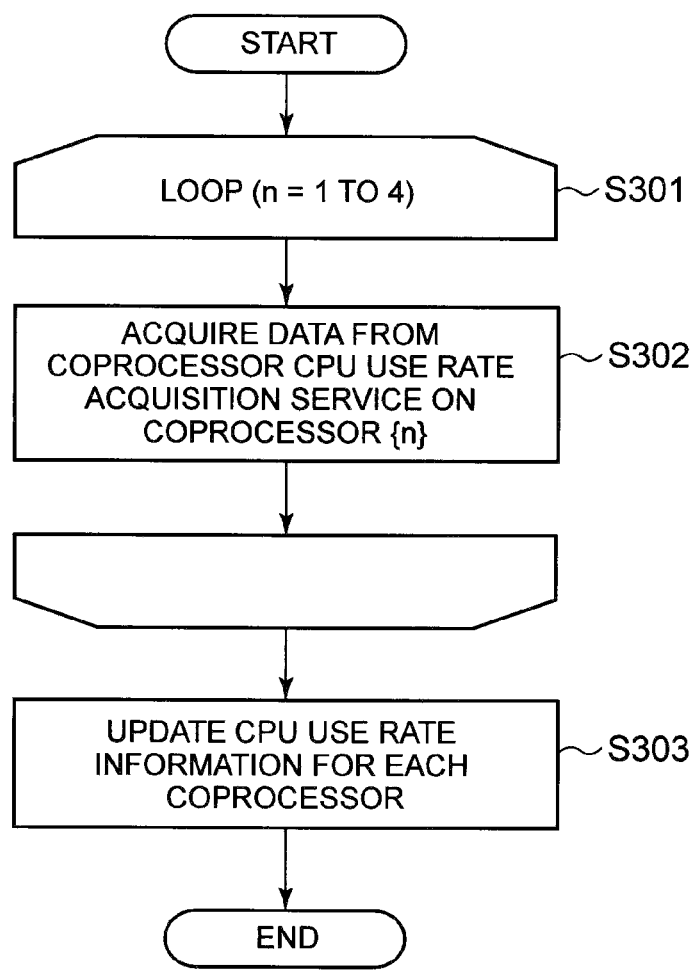
FIG. 17 It is a flowchart depicting an operation of the coprocessor use rate monitor.

FIG. 17 is a flowchart depicting the operation of the coprocessor use rate monitor 106. The coprocessor use rate monitor 106 performs the coprocessor core use rate measurement intermittently or regularly at short intervals of about several seconds.

First, the coprocessor use rate monitor 106 acquires, from the coprocessor use rate acquisition service 701 running on the coprocessor OS 421 of each coprocessor, information indicating the use rate of the cores on the coprocessor (steps S301 and S302).

Having acquired the information from all coprocessors (the coprocessors 215 to 218), the coprocessor use rate monitor 106 updates the coprocessor use rate information (step S303).

Figure 18:
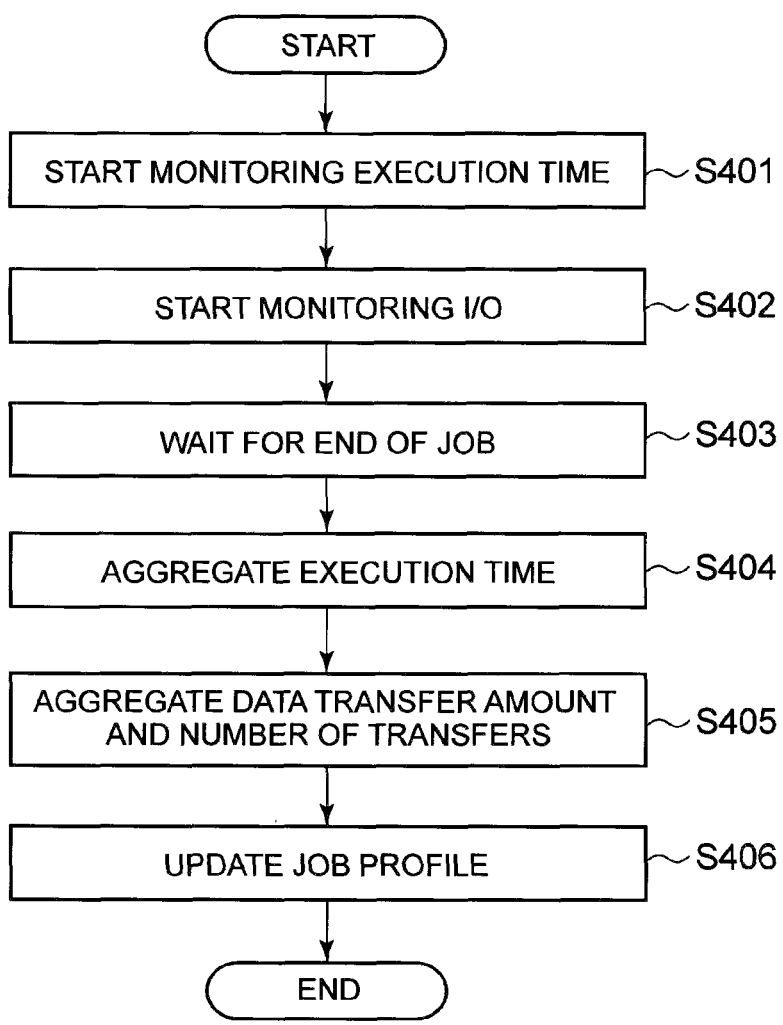
FIG. 18 It is a flowchart depicting an operation of the job profiler.

FIG. 18 is a flowchart depicting the operation of the job profiler 107. The job profiler 107 performs the job execution time measurement and the I/O measurement each time a job is executed on the coprocessor.

The hook library 603 in the job profiler 107 is linked with the shared library 606, upon executing the job. The execution time profiler 601 and the communication profiler 602 are activated by the job profiler 107, upon executing the job.

Having been activated, the execution time profiler 601 starts monitoring the execution time of the job (step S401). Having been activated, the communication profiler 602 starts monitoring the I/O communication (step S402).

When the job ends (step S403), the execution time profiler 601 aggregates the execution time of the job (step S404), and the communication profiler 602 aggregates the data transfer amount and the number of I/O transfers by the job (step S405).

The job profiler 107 then updates the job profile of the executed job (step S406). Even with the same job, there is a possibility that the CPU time, the data transfer amount, and the number of I/O transfers change each time the job is executed. Accordingly, in this exemplary embodiment, when updating the job profile of the job, the job profiler 107 calculates the average of each of the CPU time, the data transfer amount, and the number of I/O issuances for several tens of past execution instances, and updates the job profile based on the calculation results.

Figure 19:
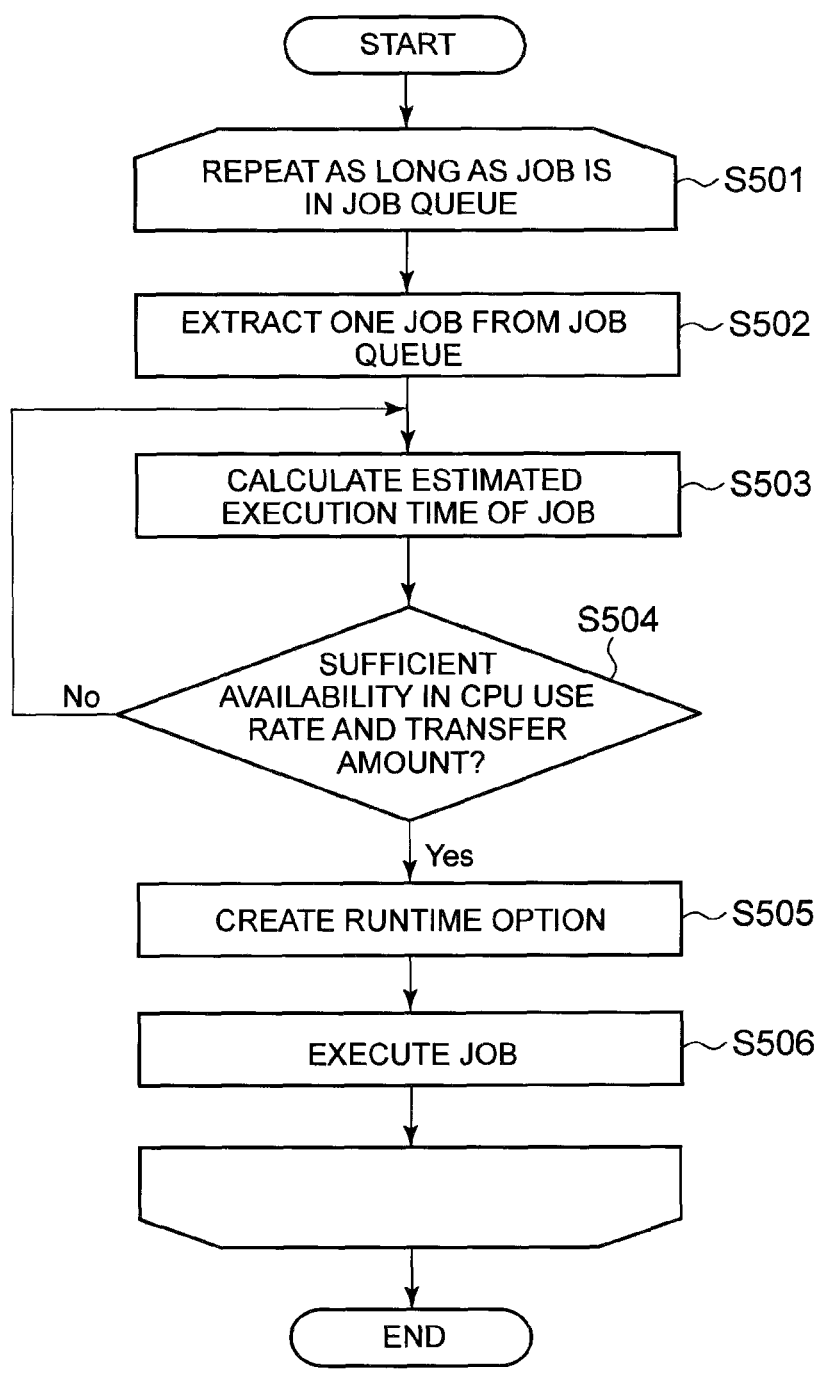
FIG. 19 It is a flowchart depicting operations of a dispatch determination unit and a dispatch execution unit.

FIG. 19 is a flowchart depicting the operations of the dispatch determination unit 102 and the dispatch execution unit 103.

The process depicted in FIG. 19 is repeatedly performed while any job is stored in the job queue 101, after startup of the computer (step S501).

The dispatch determination unit 102 extracts one job from the job queue 101 (step S502), and performs the dispatch determination process (the process of steps S503 and S504).

The dispatch determination unit 102 refers to the latest I/O affinity table, I/O transfer amount information, coprocessor use rate information, and job profile, and calculates the estimated execution time of the job for each combination of coprocessor and I/F card (step S503).

The estimated execution time in the case of executing the job using coprocessor n and I/F card m can be calculated by the following equation.

(Estimated execution time of job)=(CPU time of job)/
(number of unused cores in coprocessor $n$)+(data
transfer amount of job)/(throughput of I/F card
$m$)+(number of I/O issuances of job)×(latency of
I/F card $m$).

The dispatch determination unit 102 calculates the above-mentioned estimated execution time for all combinations of coprocessors and I/F cards, and selects a combination with the shortest estimated execution time from all combinations.

In the case where a job is input in a state where there is no availability in the coprocessor use rate or the I/O band, there is a possibility that the execution time of one job is extremely long. Accordingly, the dispatch determination unit 102 uses the following method to prevent the execution time of one job from being extremely long. Note that other prevention methods may be used.

In the case where the shortest estimated execution time of the job from among the estimated execution times for all combinations of coprocessors and I/F cards calculated by the above-mentioned equation is sufficiently short (step S504: Yes), the dispatch determination unit 102 determines that the job can be dispatched, and proceeds to the next process. Otherwise (step S504: No), the dispatch determination unit 102 waits for a predetermined period and then returns to step S503, and calculates the estimated execution time again. Whether or not the calculated estimated execution time is sufficiently short may be determined based on, for example, whether or not the estimated execution time does not exceed double the shortest execution time in the case where the job is executed under ideal conditions. The ideal conditions mentioned here mean a state where there is full availability in the coprocessor use rate and the I/O band, i.e. the coprocessor use rate and the I/F card transfer amount are both 0.

In the case of determining that the job can be dispatched, the dispatch determination unit 102 outputs the job to the dispatch execution unit 103 together with the coprocessor number and the I/F card number to be used.

The dispatch execution unit 103 creates the final runtime option, from the runtime option and the used I/F designation option in the job configuration (step S505). For example, in the case where the I/F card number received from the dispatch determination unit 102 is "IF3", i.e. in the case where the dispatch determination unit 102 determines to use the I/F card 221, the final runtime option is "-A -t 10 -i IF3".

After this, the dispatch execution unit 103 transfers the job binary to the selected coprocessor, designates the final runtime option, and causes the coprocessor to execute the job (step S506). For example, in the case of designating the above-mentioned runtime option and causing the coprocessor to execute the job, the dispatch execution unit 103 outputs the following command to the coprocessor.

/tmp/job.exe -A -t 10 -i IF3

When the job is executed, the dispatch determination unit 102 and the dispatch execution unit 103, without waiting for the end of the job, start the process (the process of steps S502 to S506) for the next job.

As described above, in this exemplary embodiment, the respective I/O affinities (respective latencies, respective throughputs) between the plurality of coprocessors and the plurality of I/F cards are measured beforehand, and job scheduling is performed based on the coprocessor use rates, the I/F card use rates, and the I/O affinities. The increase of the job execution time due to the I/O band or the I/O latency as a bottleneck can thus be prevented. Therefore, in a computer that executes a plurality of jobs by a plurality of coprocessors in parallel, the execution time of the plurality of jobs can be reduced, which contributes to improved performance of the computer.

Moreover, in this exemplary embodiment, the I/F card used when executing the job can be designated. The execution of the job under poor I/O band or I/O latency conditions can thus be prevented, which contributes to improved performance of the computer.

Besides, in this exemplary embodiment, the information indicating the features of the job, such as the execution time of the job executed by the coprocessor, is recorded as the job profile. The combination of coprocessor and I/F card capable of executing the job in the shortest time is then selected using the coprocessor use rate, the I/F card use rate, the I/O affinity, and the job profile. The execution time of the plurality of jobs can be further reduced in this way.

Furthermore, in this exemplary embodiment, the I/O affinity of the system is measured upon startup. Hence, not only the affinity regarding the I/O band and the I/O latency based on the hardware structure but also the affinity based on the software such as a driver can be added to the scheduling conditions. This improves the job execution time estimation accuracy, and enables efficient use of the resources of the computer.

Figure 20:
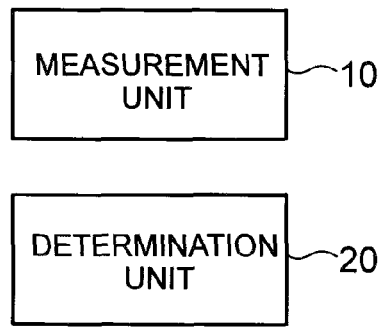
FIG. 20 It is a block diagram depicting a minimum structure of an information processing device according to the present invention.
Figure 21:
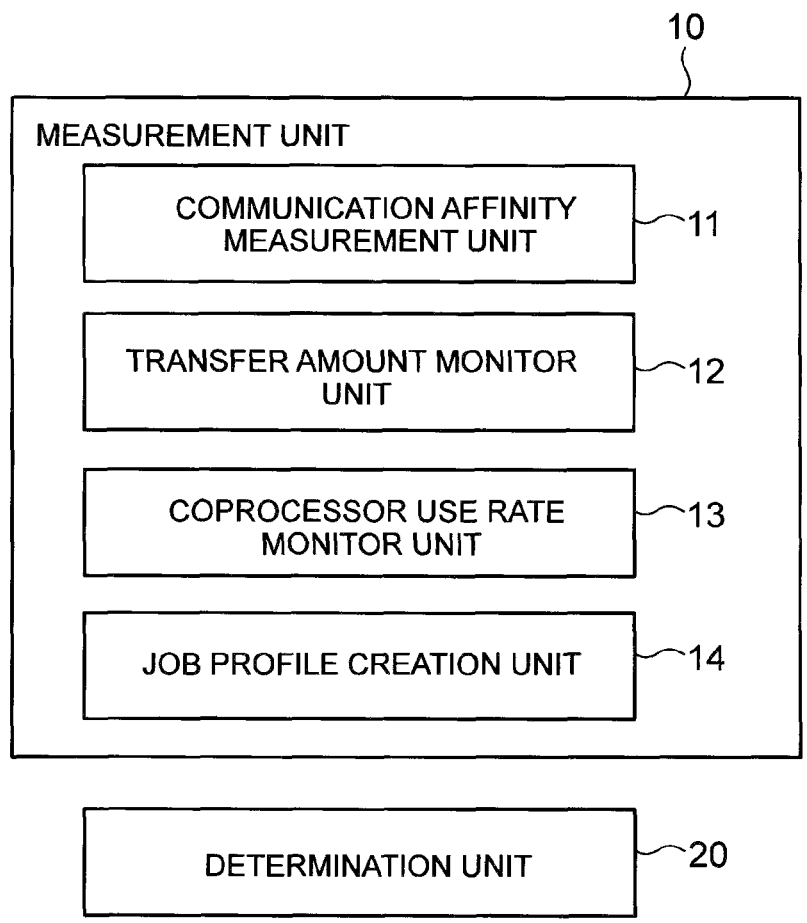
FIG. 21 It is a block diagram depicting another minimum structure of the information processing device according to the present invention.

FIG. 20 is a block diagram depicting a minimum structure of an information processing device according to the present invention. FIG. 21 is a block diagram depicting another minimum structure of the information processing device according to the present invention.

As depicted in FIG. 20, the information processing device (corresponding to the information processing device 100 depicted in FIG. 1) includes: a measurement unit 10 (corresponding to the I/O affinity table creation unit 104, the I/O transfer amount monitor 105, and the coprocessor use rate monitor 106 in the information processing device 100 depicted in FIG. 1) for measuring respective use rates of a plurality of coprocessors each for executing a job, respective use rates of a plurality of interface cards each for passing data input or output by each of the plurality of coprocessors, and respective latencies and respective throughputs in communication between the plurality of coprocessors and the plurality of interface cards; and a determination unit 20 (corresponding to the dispatch determination unit 102 and the dispatch execution unit 103 in the information processing device 100 depicted in FIG. 1) for determining a coprocessor that is to execute the job from among the plurality of coprocessors, based on a result of the measurement by the measurement unit 10.

With this structure, the increase of the job execution time due to the I/O band or the I/O latency as a bottleneck can be prevented.

The following information processing devices are also disclosed in the exemplary embodiment described above.

(1) The information processing device wherein the determination unit 20 determines an interface card that is to pass the data input or output by the coprocessor from among the plurality of interface cards, based on the result of the measurement by the measurement unit 10.

With this structure, the execution of the job under poor I/O band or I/O latency conditions can be prevented, which contributes to improved performance of the computer.

(2) As depicted in FIG. 21, the information processing device wherein the measurement unit 10 includes: a communication affinity measurement unit 11 (corresponding to the I/O affinity table creation unit 104 in the information processing device 100 depicted in FIG. 1) for measuring a latency and a throughput in communication between each of the plurality of coprocessors and each of the plurality of interface cards, and creating communication affinity information including a result of the measurement; a transfer amount monitor unit 12 (corresponding to the I/O transfer amount monitor 105 in the information processing device 100 depicted in FIG. 1) for measuring a data transfer amount of each of the plurality of interface cards, and creating transfer amount information including a result of the measurement; and a coprocessor use rate monitor unit 13 (corresponding to the coprocessor use rate monitor 106 in the information processing device 100 depicted in FIG. 1) for acquiring a core use rate from each of the plurality of coprocessors, and registering the core use rate in coprocessor use rate information, and wherein the determination unit 20 acquires the communication affinity information, the transfer amount information, and the coprocessor use rate information from the measurement unit 10 as the result of the measurement.

With this structure, the coprocessor use rate, the I/F card use rate, and the I/O affinity can be measured more accurately, so that the execution time of the plurality of jobs can be reduced more reliably.

(3) As depicted in FIG. 21, the information processing device wherein the measurement unit 10 includes a job profile creation unit 14 (corresponding to the job profiler 107 in the information processing device 100 depicted in FIG. 1) for measuring an execution time, a data transfer amount, and a number of input or output request issuances of the job executed by a coprocessor, and creating a job profile including a result of the measurement, and wherein, when determining the coprocessor that is to execute the job and the interface card that is to pass the data input or output by the coprocessor, the determination unit 20 calculates, for each of all combinations of the plurality of coprocessors and the plurality of interface cards, an estimated execution time of the job to be executed, and selects a combination of a coprocessor and an interface card with a shortest estimated execution time, using the job profile.

With this structure, the combination of coprocessor and I/F card capable of executing the job in the shortest time can be selected, as a result of which the execution time of the plurality of jobs can be further reduced. It is also possible to improve the job execution time estimation accuracy, thus enabling efficient use of the resources of the computer.

In the scheduling scheme described in PTL 1, scheduling is performed mainly depending on only the coprocessor use rate. Accordingly, in the case where coprocessors or accelerators having the I/O communication function are used, the scheduling scheme described in PTL 1 has a possibility of a decrease in performance due to the I/O communication as a bottleneck.

According to the present invention, in the case of executing a plurality of jobs by a plurality of coprocessors in parallel, the execution time of the plurality of jobs can be reduced.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An information processing device comprising:
a processor; and
a non-transitory computer-readable medium storing computer-executable code that the processor executes to realize a plurality of units comprising:
a measurement unit for measuring respective use rates of a plurality of coprocessors each for executing a job, respective use rates of a plurality of interface cards where data input or output by each of the plurality of coprocessors pass, and respective latencies and respective throughputs in communication between the plurality of coprocessors and the plurality of interface cards; and
a determination unit for determining a coprocessor that is to execute the job from among the plurality of coprocessors, based on a result of the measurement by the measurement unit, and determining an interface card where the data input or output by the coprocessor pass from among the plurality of interface cards;
wherein the measurement unit includes a job profile creation unit for measuring an execution time, a data transfer amount, and a number of input or output request issuances of the job executed by a coprocessor, and creating a job profile including a result of the measurement, and wherein, when determining the coprocessor that is to execute the job and the interface card where the data input or output by the coprocessor pass, the determination unit calculates, for each of all combinations of the plurality of coprocessors and the plurality of interface cards, an estimated execution time of the job to be executed, and selects a combination of a coprocessor and an interface card with a shortest estimated execution time, using the job profile.

2. The information processing device according to claim 1, wherein the measurement unit includes: a communication affinity measurement unit for measuring a latency and a throughput in communication between each of the plurality of coprocessors and each of the plurality of interface cards, and creating communication affinity information including a result of the measurement; a transfer amount monitor unit for measuring a data transfer amount of each of the plurality of interface cards, and creating transfer amount information including a result of the measurement; and a coprocessor use rate monitor unit for acquiring a core use rate from each of the plurality of coprocessors, and registering the core use rate in coprocessor use rate information, and wherein the determination unit acquires the communication affinity information, the transfer amount information, and the coprocessor use rate information from the measurement unit as the result of the measurement.

3. A job scheduling method comprising:

measuring respective use rates of a plurality of coprocessors each for executing a job, respective use rates of a plurality of interface cards where data input or output by each of the plurality of coprocessors pass, and respective latencies and respective throughputs in communication between the plurality of coprocessors and the plurality of interface cards;

determining a coprocessor that is to execute the job from among the plurality of coprocessors, based on a result of the measurement, and determining an interface card where the data input or output by the coprocessor pass from among the plurality of interface cards;

measuring an execution time, a data transfer amount, and a number of input or output request issuances of the job executed by a coprocessor, and creating a job profile including a result of the measurement; and when determining the coprocessor that is to execute the job and the interface card where the data input or output by the coprocessor pass, calculating, for each of all combinations of the plurality of coprocessors and the plurality of interface cards, an estimated execution time of the job to be executed, and selecting a combination of a coprocessor and an interface card with a shortest estimated execution time, using the job profile.

4. A non-transitory computer-readable recording medium having recorded thereon a job scheduling program for causing a computer to execute:

a process of measuring respective use rates of a plurality of coprocessors each for executing a job, respective use rates of a plurality of interface cards where data input or output by each of the plurality of coprocessors pass, and respective latencies and respective throughputs in communication between the plurality of coprocessors and the plurality of interface cards;

a process of determining a coprocessor that is to execute the job from among the plurality of coprocessors, based on a result of the measurement, and determining an interface card where the data input or output by the coprocessor pass from among the plurality of interface cards;

a process of measuring an execution time, a data transfer amount, and a number of input or output request issuances of the job executed by a coprocessor, and creating a job profile including a result of the measurement; and a process of, when determining the coprocessor that is to execute the job and the interface card where the data input or output by the coprocessor pass, calculating, for each of all combinations of the plurality of coprocessors and the plurality of interface cards, an estimated execution time of the job to be executed, and selecting a combination of a coprocessor and an interface card with a shortest estimated execution time, using the job profile.

* * * * *